United States Patent [19]

Yoichi

[11] 3,812,529

[45] May 21, 1974

[54] SYSTEM FOR DISCRIMINATING CLASSIFICATION OF A MAGNETIC RECORDING MEDIUM

[75] Inventor: Tsuchiya Yoichi, Tokyo, Japan

[73] Assignee: Teac Corporation, Tokyo, Japan

[22] Filed: Aug. 31, 1972

[21] Appl. No.: 285,356

[30] Foreign Application Priority Data

Aug. 31, 1971 Japan ............................... 46-66765
Aug. 31, 1971 Japan ............................... 46-66769

[52] U.S. Cl. ................................ 360/25, 360/66 D, 324/34 TA

[51] Int. Cl. ... G11b 27/22, G11b 27/34, G11b 5/02

[58] Field of Search ......... 179/100.2 B, 100.2 D, 179/100.2 K, 100.2 A; 324/34 TA

[56] References Cited

UNITED STATES PATENTS

| | | | |
|---|---|---|---|
| 2,937,368 | 5/1960 | Newby | 179/100.2 D |
| 3,601,558 | 8/1971 | Sugaya | 179/100.2 A |
| 3,535,622 | 10/1970 | Cannon et al. | 324/34 TA |
| 3,562,635 | 2/1971 | Parker | 179/100.2 B |
| 3,627,934 | 12/1971 | Riddle | 179/100.2 B |
| 2,440,575 | 4/1948 | Dedek | 179/100.2 D |
| 2,791,640 | 5/1957 | Wolfe | 179/100.2 K |

*Primary Examiner*—Stanley M. Urynowicz, Jr.
*Assistant Examiner*—Alfred H. Eddleman
*Attorney, Agent, or Firm*—Holman & Stern

[57] ABSTRACT

A system for discriminating the classifications of magnetic recording mediums comprises means for recording on a magnetic recording medium a discrimination signal of a constant frequency with a bias of a predetermined quantity, means for erasing partially the discrimination signal thus recorded with a specific degree of erasing in a manner to make possible reproduction, and means for reproducing the discrimination signal thus incompletely erased thereby to obtain a discrimination output. The level of the discrimination signal thus reproduced differs in value depending on the classification of the magnetic material of the magnetic recording medium.

10 Claims, 4 Drawing Figures

SYSTEM FOR DISCRIMINATING CLASSIFICATION OF A MAGNETIC RECORDING MEDIUM

BACKGROUND OF THE INVENTION

This invention relates to a system for distinguishing or discriminating the kind or classification of magnetic recording mediums and more particularly to a system for accomplishing discrimination of the classifications of magnetic recording mediums, such as magnetic tapes, in accordance with the magnitudes of the coercive forces of the magnetic materials on the magnetic surfaces of the recording mediums.

In general, a magnetic recording medium such as a magnetic tape or a magnetic sheet comprises a base of a non-magnetic material and a magnetic coating of a ferromagnetic iron oxide such as, for example, gamma-hematite ($\gamma$- $Fe_2O_3$), in particulate form on the surface of the base. The various characteristics of the magnetic recording medium differs with differences in the kind of this magnetic coating material.

For example, a so-called high-density magnetic tape which has recently come into use has a magnetic material of small particles and higher coercive force than an ordinary magnetic tape. This high-density magnetic tape is a high performance tape, exhibiting a characteristic of excellent rectangular hysteresis and being capable of faithfully and accurately recording even signals of high frequency, that is, signals of short wavelength. When this high-density magnetic tape is used in magnetic recording, a large bias current is necessary as a natural consequence since the coercive force is high. Accordingly, when recording is to be carried out in a magnetic recording and reproducing apparatus, it is necessary to select operational conditions such as the correct recording bias current in accordance with the classification of the magnetic material of the magnetic tape being used and the frequency characteristics of the recorded signals. For this reason, it becomes necessary to discriminate the classification of the magnetic tape to be used in accordance with the magnetic material thereof.

One method of discriminating the classification of magnetic tapes known heretofore comprises recording a signal on a magnetic tape to be discriminated, reproducing this signal, comparing the reproduction levels of the low frequency band signal and the high frequency band signal of the reproduced signal, and accomplishing the above mentioned discrimination from the difference between the levels of these two frequency bands. By this known method, however, a low frequency band signal and a high frequency band signal are required, and, furthermore, the discriminating apparatus is complicated. Consequently, the apparatus becomes expensive, whereby this method has been unsuitable for discriminating in a simple manner the classifications of various magnetic recording mediums.

SUMMARY OF THE INVENTION

Accordingly, it is a general object of this invention to provide a new and useful system for discriminating the classifications of magnetic recording mediums in which system the difficulties accompanying the above described known method are overcome.

Another and more specific object of the invention is to provide a system for discriminating the classifications of magnetic recording mediums capable of readily discriminating the classifications of magnetic recording mediums on the basis of differences in the magnitudes of the coercive forces of the magnetic recording mediums.

Still another object of this invention is to provide a system operating to discriminate the classification of a magnetic recording medium by using a single signal of a specific constant frequency in carrying out recording, incomplete erasing, and reproducing of this signal.

A further object of the invention is to provide a discrimination system adapted to discriminate the classification of a magnetic recording medium to be used in a magnetic recording and reproducing apparatus and to select a suitable recording bias with which recording can be accomplished in accordance with the result of this discrimination.

A still further object of the invention is to provide a discrimination system adapted to discriminate the classification of a magnetic recording medium to be used in a magnetic recording and reproducing apparatus and to impart a suitable frequency characteristic to the recording signal in accordance with the result of this discrimination.

An additional object of the invention is to provide a discrimination system adapted to discriminate the classification of a magnetic recording medium to be used in a magnetic recording and reproducing apparatus and to select the optimum recording level of the recording signal in accordance with the result of this discrimination.

Other objects and features of this invention will be apparent from the following detailed description with respect to preferred embodiments of the invention when read in conjunction with the accompanying drawings, throughout which like parts are designated by like reference numerals.

DETAILED DESCRIPTION

Figure 1:
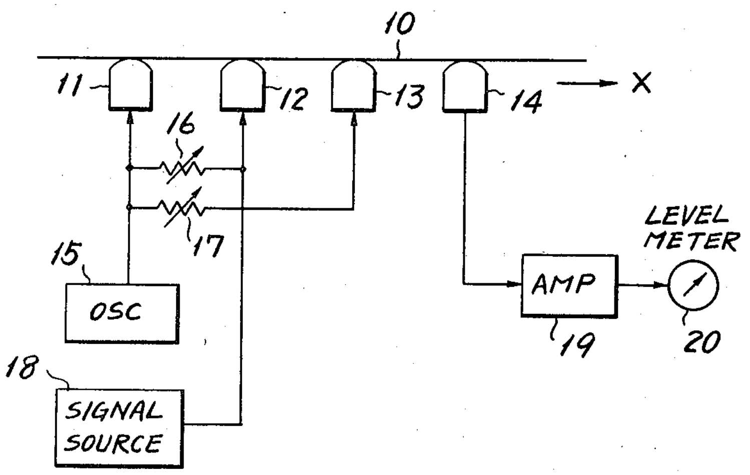
FIG. 1 is a schematic diagram of a circuit for discrimination by which a first embodiment of the system of the invention can be practiced.

In the first embodiment of the system according to this invention as illustrated in FIG. 1, a magnetic tape 10 the classification of which is to be discriminated is traveling in the arrow direction X. The classification of this magnetic tape 10 is in accordance with the coercive force of its magnetic material. In contact with this magnetic tape 10, there are disposed in sequential arrangement a magnetic head 11 for complete erasing, a magnetic head 12 for recording, a magnetic head 13 of variable magnetic field type for incomplete erasing, and a magnetic head 14 for reproducing as shown in FIG. 1.

An oscillator 15 for generating erasing and bias signals is connected to supply an erasing signal to the complete erasing head 11 and, simultaneously, to supply a specified recording bias by way of a variable resistor 16 to the recording head 12 and an erasing current by way of a variable resistor 17 to the incomplete erasing head 13. A signal generator or a signal source 18 is connected to supply a recording signal to the recording head 12. While a commercial power source frequency of 50 Hz or 60 Hz is used for the signal source 18 in the instnat embodiment, an oscillator which generates a signal of a suitable single frequency may also be used. The signal reproduced from the reproducing head 14 is amplified by a reproducing amplifier 19 and then supplied to a level meter 20 to cause the indicating pointer thereof to move.

The discrimination operation of this embodiment is as follows. First, the resistance value of the variable resistor 16 is adjusted thereby to adjust and set a bias applied from the oscillator 15 to the recording head 12 so that it becomes a suitable bias relative to the standard magnetic tape. With the bias thus set, the magnetic tape 10 is caused to travel in the arrow direction X. Then the already recorded signal is erased by the complete erasing head 11, and a signal of a constant frequency, e.g., 50 Hz, from the signal source 18 is recorded on the tape 10 by means of the recording head 12 with the bias of appropriate magnitude supplied from the oscillator 15 by way of the variable resistor 16.

At this point, unless an erasing signal is applied to the incomplete erasing head 13, the signal recorded by the recording head 12 is directly reproduced by the reproducing head 14, and the level of the signal thus reproduced is indicated on the level meter 20. Then, as an erasing current from the oscillator 15 is progressively applied by way of the variable resistor 17 to the incomplete erasing head 13, the signal recorded by the recording head 12 on the tape 10 is incompletely erased by a certain quantity, and the level of the recorded signal is decreased. The recorded signal remaining after partial or incomplete erasing by the erasing head 13 is reproduced by the reproducing head 14, and the level of the resulting reproduced signal is indicated by the level meter 20. At this time, the level meter 20 indicates a level which is reduced more than that in the case where erasure by the erasing head 13 as described above has not been carried out.

The facility or difficulty of recording and the facility or difficulty of erasing differ with the kind or classification according to the magnetic material of the magnetic tape 10, that is, for example, the classification determined by whether the tape 10 is an ordinary tape or a high-density tape. For this reason, when the above mentioned recording, incomplete erasing, and reproducing are carried out under the same conditions such as the magnitude of the bias current and the magnitude of the erasing current, the levels indicated on the level meter 20 differ depending on the classification of the magnetic tape used. Therefore, by observing the indication of the level meter 20, the classification of the magnetic tape 10 can be discriminated.

The strength of the erasing magnetic field of the erasing head 13 of variable field type is regulated by the variable resistor 17, the resistance value of which is adjusted to a value such that the degrees of attenuation of the levels of the magnetic tapes of the various kinds are clearly indicated. Examples of experiments in determining the strength of this erasing magnetic field of the incomplete erasing head 13 are described below.

Magnetic tapes of classifications A, B, and C are selected, for example, as follows.

A. ordinary normal magnetic tape (optimum bias 100 percent)

B. high-density magnetic tape (optimum bias 130 percent)

C. high-density magnetic tape (optimum bias 140 percent)

On each of these tapes, a signal of 50 Hz is recorded with a bias value of 130 percent by the recording head 12 and then erased with a constant rate of erasing, whereupon the degree of erasing becomes as indicated below.

| Magnetic tape classification | Optimum bias (%) | Erasing degree (dB) |
|---|---|---|
| A | 100 | −20 |
| B | 130 | −10 |
| C | 140 | −6 |

That is, when, with the tape of classification A taken as a standard, the recorded signal is erased to a degree such that the reproducing level of this tape will be −20 dB relative to the recording level, the reproducing levels with respect of the tapes of classifications B and C become −10 dB and −6 dB relative to the recording levels. Therefore, the classification of the tape which is to be distinguished or discriminated by the difference in degrees of erasing, i.e., difference in reproducing levels, can be discriminated by merely observing the level meter 20.

After discriminating the classification of the tape in this manner, the optimum recording bias for this classification is set, and recording of the desired recording signal is carried out.

Figure 2:
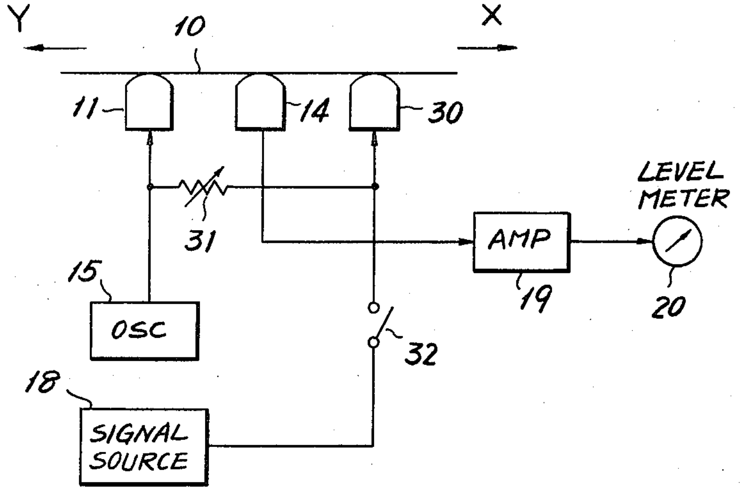
FIG. 2 is a schematic diagram of a circuit for discrimination by which a second embodiment of the system of the invention can be practiced.

A second embodiment of the system of this invention is shown in FIG. 2, in which parts which are the same as or equivalent to those of the block system shown in FIG. 1 are designated by the same reference numerals. In this embodiment, the complete erasing magnetic head 11, the reproducing magnetic head 14, and a recording and incomplete erasing magnetic head 30 are arranged in sequence as indicated in FIG. 2. The oscillator 15 for generating erasing and bias signals is connected to supply an erasing current to the complete erasing head 11 and an erasing current to the recording and incomplete erasing head 30 by way of a variable resistor 31.

The signal source 18 is connected through a switch 32 to the recording and incomplete erasing head 30 and supplies a recording signal to this head 30 when the switch 32 is closed. Since the operation of the variable resistor 31 is similar to that of the variable resistor 16 in the above described first embodiment, its description will be omitted.

First, the magnetic tape 10 is caused to travel in the direction of arrow X, and the switch 32 is closed. The recording and incomplete erasing head 30 is used as a recording head. A suitable bias signal from the oscillator 15 is superimposed on a signal of 50 Hz from the signal source 18, and the resulting signal is recorded on the traveling tape 10.

Next, the tape 10 with the signal recorded thereon as described above is caused to travel in the direction opposite to the direction X, that is, in the direction Y, and the switch 32 is opened. Then, as the tape 10 travels in the direction Y, the signal recorded thereon once again passes by the recording and incomplete erasing head 30. At this time, no signal is being supplied from the signal source 18 to this head 30, and only a signal from the oscillator 15 is being supplied thereto. Consequently, the head 30 operates as an incomplete erasing head to erase the signal recorded on the tape 10 to a certain level as determined by a recording bias magnetic field produced by the oscillator 15.

The signal which has been thus incompletely erased by the head 30 is reproduced by the reproducing head 14. The signal thus reproduced is amplified by the amplifier 19 and then drives the level meter 20, which thereupon indicates the level thereof. Depending on the magnitude of the level thus indicated, the classification of the tape, that is, whether it is a kind of normal tape or a high-density tape, can be discriminated. Thereafter, the recorded signal which has been erased to the above mentioned certain level and has passed by the reproducing head 14 is completely erased by the complete erasing head 11.

In the instant embodiment, the head 30 operates both as a recording head and an incomplete erasing head. For this reason a separate head exclusively for incomplete erasing, as is used in the preceding first embodiment, is unnecessary, whereby the system organization is simplified.

In order to accomplish recording with the system in an optimum state irrespective of the difference of the classification of the magnetic material of the tape used as described hereinbefore, variable setting of the recording conditions as, for example, the recording bias current value, the frequency characteristic of the recording signal, and the recording signal level, is necessary. Accordingly, a system adapted to accomplish recording on a magnetic recording medium in a magnetic recording and reproducing apparatus through utilization of the above described principle of the level discrimination system according to this invention and under the optimum recording conditions in accordance with result of the discrimination will now be described with reference to FIGS. 3 and 4.

Figure 3:
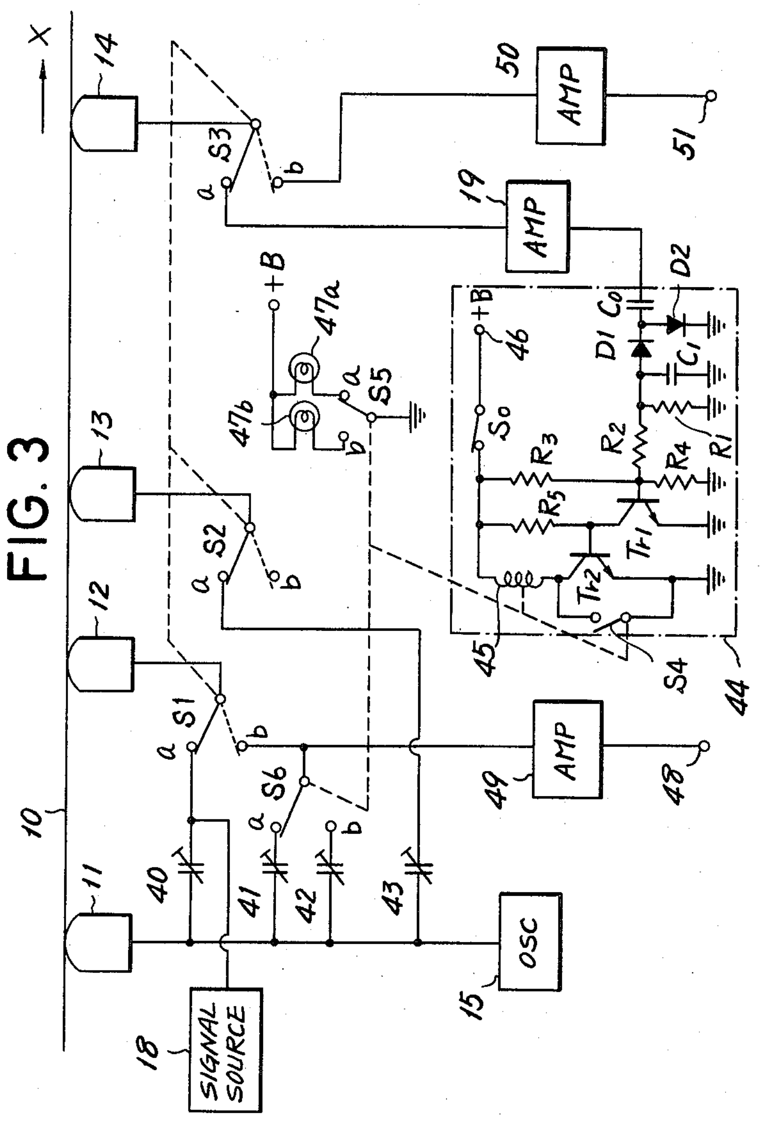
FIG. 3 is a schematic diagram of a discrimination and selective control circuit by which a third embodiment of the system of the invention can be practiced.

FIG. 3 is a schematic diagram for a circuit constituting one embodiment of a system for discriminating the level and changing over the conditions of recording. The parts in FIG. 3 which are the same as or equivalent to those in FIG. 1 are designated by the same reference numerals.

First, the operation of discriminating the classification of the magnetic tape 10, which operation is carried out prior to the recording of the desired recording signal, will be described. For this operation, the movable contacts of change-over switches $S_1$, $S_2$, and $S_3$ respectively connected to the recording head 12, incomplete erasing head 13, and reproducing head 14 are placed in contact with the contact points on side *a.* A signal from the erasing signal and bias signal oscillator 15 is supplied as an erasing signal to the complete erasing head 11. At the same time, after being suitably attenuated by a trimmer condenser 43, this signal is supplied as an erasing signal also to the incomplete erasing head 13 by way of the switch $S_2$.

On one hand, a signal from the signal source 18, for example, a commercial power supply frequency of 50 Hz, is supplied through the switch $S_1$ to the recording head 12. Simultaneously, a signal from the oscillator 15 passes through a trimmer condenser 40 and is then supplied as a recording bias signal through the switch $S_1$ to the recording head 12.

Then, when the magnetic tape 10 used for recording is caused to travel in the direction X, a signal of a specific frequency from the signal source 18 is superimposed by the above mentioned bias signal and is recorded at a predetermined level on the tape by the recording head 12. The signal thus recorded on the tape 10 is erased by a suitable degree, when it passes by the incomplete erasing head 13, by this head 13, which is being supplied with an erasing signal from the oscillator 15 by way of the trimmer condenser 43. The degree to which the recorded signal is erased by this head 13 differs with the kind or classification of the magnetic tape 10 as mentioned hereinabove.

In this connection, since the strength of the erasing magnetic field of the erasing head 13 varies with the capacitance value of trimmer condenser 43, this capacitance value is adjusted and set at a value such that the degrees of level attenuation of the various magnetic tapes become clearly apparent.

The signal on the tape 10 which has been erased to a certain degree by the erasing head 13 as described above is then reproduced by the reproducing head 14. The resulting reproduced signal from the reproducing head 14 is supplied through the switch $S_3$ to the reproducing amplifier 19, thereby being amplified, and is then supplied to a switching circuit 44 indicated within a single-dot chain line enclosure. Here, the level of the reproduced signal, differs with the classification of the magnetic tape 10 as mentioned above, being high in the case where the tape 10 is a high-density tape.

The signal supplied to the switching circuit 44 passes through a capacitor $C_0$ for blocking a D.C. component, a rectifying circuit comprising diodes $D_1$ and $D_2$ and operating to take out negative half waves and a smoothing circuit comprising a capacitor $C_1$ and resistors $R_1$ and $R_2$ and is applied to the base of an NPN transistor $Tr_1$ of emitter grounded type. This transistor $Tr_1$ is in its conductive state, receiving a base bias due to resistors $R_3$ and $R_4$. The base bias due to these resistors $R_3$ and $R_4$ is set at a value such that, in the case where the magnetic tape 10 is a normal tape, the transistor does not become non-conductive with a small negative voltage applied on the base by way of the above mentioned rectifying circuit and smoothing circuit.

In the case where the magnetic tape 10 is a high-density tape as described above, the level of the reproduced signal from the reproducing head 14 is high, and the negative voltage applied on the base of the transistor $Tr_1$ through the rectifying and smoothing circuits is also high. Therefore, in the case where the tape 10 is a high-density tape, the transistor $Tr_1$ assumes its non-conductive state.

The collector of the transistor $Tr_1$ is connected to the base of an NPN transistor $Tr_2$ of emitter grounded type, which is in its non-conductive state when the transistor $Tr_1$ is conductive. However, when the transistor $Tr_1$ becomes non-conductive as mentioned above, the transistor $Tr_2$ whose base is connected to a +B power supply through a resistor $R_5$ becomes conductive. When the transistor $Tr_2$ thus becomes conductive, a relay coil 45 connected in series with the transistor $Tr_2$ between the power source and ground is supplied with electric power and operates.

As one result of this operation of the relay coil 45, the movable contact of a relay switch $S_5$ is changed over and connected to its contact *b*, whereupon a lamp 47*b* is lit to indicate that the tape 10 is a high-density tape. As another result of the operation of the relay coil 45, the movable contact of a relay switch $S_6$ is changed over and connected to its contact *b* and thereby connected to a trimmer condenser 42. Consequently, a signal from the oscillator 15 passes through the switch $S_6$ by way of the trimmer condenser 42, and the recording bias is switched and set at the optimum value for the high-density tape.

By the above described operation, discrimination of the classification of the magnetic tape 10 and the accompanying changing over and setting of the recording condition (the value of the optimum bias in this case) are accomplished.

A still another result of the operation of the relay coil 45, a normally opened relay switch $S_4$ is closed, whereby the relay coil 45 becomes self-held. The discrimination of the magnetic tape is thereby completed. The tape 10 is then stopped, or the system is placed in the recording state with respect to the tape 10. Even when the reproducing head 14 no longer produces a reproduced output, and the transistor $Tr_2$ becomes non-conductive, the relay coil 45 is held in its operative state.

Next, at the time of recording of an actual, desired recording signal on a magnetic tape 10, the movable contacts of the change-over switches $S_1$, $S_2$, and $S_3$ are respectively changed over from their contacts *a* to their contacts *b*. As a consequence, a signal from the oscillator 15 passes through the trimmer condenser 42 and switches $S_6$ and $S_1$ and is applied as a recording bias signal on the recording head 12. The erasing head 13 is rendered inoperative by the switching of the switch $S_2$. Then, in the case where the tape part used for the above described discrimination is rewound to a point before the erasing head 11, where this tape part is not used, the recording signal is applied directly as it is to a terminal 48. This recording signal is amplified by a recording amplifier 49 and then applied by way of the switch $S_1$ to the recording head 12, where, with the above mentioned optimum recording bias signal superimposed thereon, it is recorded in an optimum state on the magnetic tape 10. The reproducing head 14 is used as a head for monitoring reproduction at the time of recording and as an ordinary reproducing head at the time of reproduction. A reproduced signal from this reproducing head is supplied through the switch $S_3$ to a reproducing amplifier 50, where is is amplified and is then led out through a terminal 51.

When the recording is completed, and the tape recorder is placed in the stopped state, a switch $S_0$ is opened, and the relay coil 45 is rendered inoperative. Consequently, the movable contacts of switches $S_5$ and $S_6$ are switched to their contacts *a*, and the switch $S_4$ is opened, whereby the relay coil 45 is released from its former self-held state.

In the case where the magnetic tape 10 is an ordinary tape, single-frequency signal recording by means of the recording head, incomplete erasing by means of the erasing head 13, and reproducing head 14 are carried out with the switches $S_1$, $S_2$, and $S_3$ switched to their respective contact points *a* similarly as described hereinabove. In the instant case, the level of the reproduced signal from the reproducing head 14 is low, and the transistor $Tr_1$ of the switching circuit 44 does not attain its non-conductive state but remains conductive.

Since the transistor $Tr_1$ remains in its conductive state, and the transistor $Tr_2$ is in its non-conductive state, the relay coil 45 remains inoperative, its circuit being opened by the transistor $Tr_2$. Consequently, the moving contact of the switch $S_5$ is placed in contact with the contact *a*, and another lamp 47*a* is lit to indicate that the tape 10 is an ordinary tape. Furthermore, the movable contact of the switch $S_6$ is also placed in contact with its contact *a*, whereby bias setting by a trimmer condenser 41 is accomplished.

In general, a high-density tape has a magnetic surface of smaller magnetic particles and greater coercive force than an ordinary tape, as described before. For this reason, in the case where a recording signal is passed through an equalizing circuit for an ordinary tape and is recorded and reproduced, the frequency characteristic of the reproduced signal is such that the frequency response in the high frequency band becomes relatively increased. Accordingly, between an ordinary tape and a high-density tape, selective changing over of not only the recording bias value but also the frequency characteristic is necessary. Furthermore, since the coercive force of a high-density tape is large, it is necessary in recording on a high-density tape to increase the signal level above that in the case of an ordinary tape.

Figure 4:
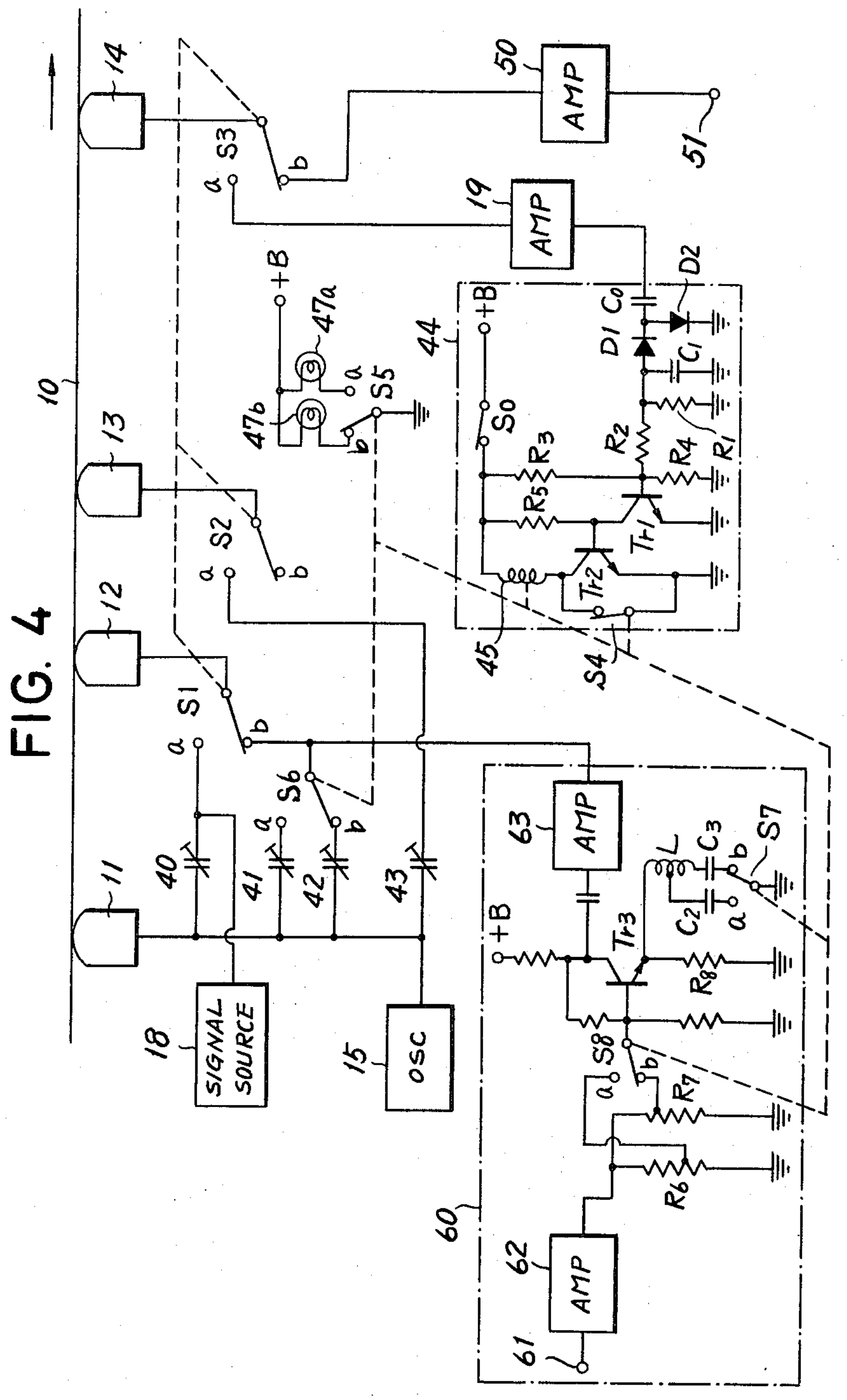
FIG. 4 is a schematic diagram of a discrimination and selective control circuit by which a fourth embodiment of the system of the invention can be practiced.

Accordingly, another embodiment of changing over and setting recording conditions according to discrimination of the classification of the magnetic tape 10 will now be described with reference to FIG. 4.

In this system, there is provided a recording amplifier system 60. A recording signal supplied to the input terminal 61 of this system 60 is amplified by an amplifier 62, is then level adjusted by a variable resistor $R_6$ or $R_7$, and is thereafter applied to contact *a* or *b* of a relay switch $S_8$ of the relay 45. The signal thus passing through the switch $S_8$ passes through a transistor $Tr_3$ and is amplified by an amplifier 63, thereafter passing through the switch $S_1$ to be applied to the recording head 12.

Then in the case where the tape 10 used is an ordinary tape, the transistor $Tr_1$ does not attain its non-conductive state even if there is a reproduced output from the reproducing head 14, as was described hereinbefore with reference to FIG. 3, while the transistor $Tr_2$ is in its non-conductive state, whereby the relay coil 45 is inoperative. For this reason, the movable contacts of the relay switches $S_5$, $S_6$, $S_7$, and $S_8$ of the relay coil 45 remain in contact with their respective contacts *a*, and the relay switch $S_4$ remains opened. Consequently, the lamp 47*a* for indicating an ordinary tape is lit, similarly as in the embodiment illustrated in FIG. 3, and, at the same time, the bias setting by means of the trimmer condenser 41 is selected.

Because the switch $S_8$ is in its state of connection with its contact *a*, the setting of the level of the optimum recording signal for the ordinary tape by means of the variable resistor $R_6$ is selected. The variable resistor $R_6$ is set at a relatively high resistance level, and a signal passing therethrough is set at a relatively low level.

Furthermore, because of the state of connection of the switch $S_7$ with its contact *a*, a capacitor $C_2$ and a portion of the inductance of a coil L, an intermediate tap of which is connected to the capacitor $C_2$, are connected in series between the emitter of the transistor $Tr_3$ and ground and, moreover, in parallel with a resistor $R_8$ as an equalizing circuit. Consequently, a signal passing through the transistor $Tr_3$ is caused to have the optimum recording frequency characteristic for the ordinary tape.

Accordingly, the resulting recording signal, with a level thus set by the variable resistor $R_6$ and a frequency characteristic set by the equalizing circuit comprising a portion of the coil L and the capacitor $C_2$, is superimposed by a bias signal set by the trimmer condenser 41 and is recorded on the ordinary tape under the optimum recording condition by the recording head 12.

Then, in the case where the tape 10 used is a high-density tape, the transistor $Tr_2$ assumes its conductive state, and the relay coil 45 operates, whereby the movable contacts of the relay switches $S_5$, $S_6$, $S_7$, and $S_8$ are switched to their respective contacts b, and the relay switch $S_4$ is closed. Consequently, the lamp 47*b* for indicating the high-density tape is lit, and, at the same time, the setting of the bias by the trimmer condenser 42 is selected.

Because the switch $S_8$ is switched to its contact *b*, the setting of the optimum recording signal level for the high-density tape by the variable resistor $R_7$ is selected. Here, the variable resistor $R_7$ is set at a relatively low resistance value, and a signal passing therethrough is set at a relatively high level.

Furthermore, since the switch $S_7$ is switched to its contact *b*, a capacitor $C_3$ and the coil L are connected in series between the emitter of the transistor $Tr_3$ and ground and, moreover, in parallel with the resistor $R_8$ as an equalizing circuit. Consequently, a signal passing through the transistor $Tr_3$ is caused to have the optimum recording frequency characteristic for the high-density tape.

Accordingly, the resulting recording signal, with a level thus set by the variable resistor $R_7$ and a frequency characteristic set by the equalizing circuit comprising the coil L and the capacitor $C_3$, is superimposed by a bias signal set by the trimmer condenser 42 and is recorded on the high-density tape under the optimum recording conditions by the recording head 12.

Further, this invention is not limited to these embodiments but various variations and modifications may be made without departing from the scope and spirit of the invention.

What I claim is:

1. A system for discriminating the classification of a magnetic recording medium comprising: a signal source for supplying a signal of a constant frequency for discrimination; means for generating a bias signal; means for recording with a predetermined level the superimposed bias signal from said bias signal generating means on said signal for discrimination from said signal source on the magnetic recording medium to be discriminated; means for erasing partially said signal for discrimination thus recorded on the magnetic recording medium with a predetermined erasing rate within the extent that said signal for discrimination thus erased can be reproduced thereafter; means for reproducing said signal for discrimination thus partially erased, the resulting reproduced signal having a level value differing with the classification on the basis of the difference of coercive force of the magnetic material of the magnetic recording medium; and means for producing a discrimination output corresponding to the classification of the magnetic recording medium in accordance with said level value of the reproduced signal.

2. A system for discriminating the classification of a magnetic recording medium comprising: a complete erasing magnetic head for erasing completely any previously recorded signals on the magnetic recording medium to be discriminated; a signal source for supplying a signal of a constant frequency for discrimination; means for generating a bias signal and an erasing signal; a recording magnetic head for recording with a predetermined level the superimposed bias signal from said bias signal generating means on said signal for discrimination from said signal source on the magnetic recording medium to be discriminated; a partial erasing magnetic head for erasing partially said signal for discrimination thus recorded on the magnetic recording medium with a predetermined erasing with the extent that said signal for discrimination thus erased can be reproduced thereafter; a reproducing magnetic head for reproducing the signal for discrimination partially erased by the erasing head, the resulting reproduced signal having a level value differing with the classification on the basis of the difference of the coercive force of the magnetic material of the magnetic recording medium; and means for producing a discrimination output corresponding to the classification of the magnetic recording medium in accordance with said level value of the reproduced signal, said complete erasing magnetic head, said recording magnetic head, said partial erasing magnetic head, and said reproducing magnetic head being disposed in the sequence named along the path and in the direction of travel of the magnetic recording medium.

3. A system for discriminating the classification of a magnetic recording medium comprising: a complete erasing magnetic head for erasing completely any previously recorded signals on the magnetic recording medium to be discriminated; a signal source of supplying a signal of a constant frequency for discrimination; means for generating a bias signal and an erasing signal; a recording and partial erasing magnetic head supplied with said signal for discrimination from said signal source and a signal from said generating means; means for moving the magnetic medium in one direction and in a direction opposite to said one direction; switching means connected between said signal source and said recording and partial erasing magnetic head, said switching means being held in its closed state at the time of recording said signal for discrimination on the magnetic medium moving in said one direction thereby to record on the magnetic recording medium by way of said recording and partial erasing magnetic head said signal for discrimination with said signal from said generating means and being held in its opened state at the time of partial erasing said signal for discrimination thus recorded on the magnetic recording medium moving in the direction opposite to said one direction with a predetermined erasing rate thereby to partially erase by way of said recording and partial erasing magnetic head the recorded signal for discrimination with said signal from said generating means within the extent that said signal for discrimination thus erased can be reproduced thereafter; a reproducing magnetic head for reproducing the signal for reproduction thus recorded and partially erased by said recording and partial erasing head, the resulting reproduced signal having a level value differing with the classification on the basis of the difference of the coercive force of the magnetic material of the magnetic recording medium; means for producing a discrimination output corresponding to the classification of the magnetic recording medium in accordance with the level value of the reproduced signal; said complete erasing magnetic head, said reproducing magnetic head and said recording and partial erasing magnetic head being disposed in the sequence named along the path and in said one direction of travel of the magnetic recording medium.

4. A system for discriminating the classification of a magnetic recording medium as claimed in claim 1 in which said signal source is a commercial electric power source, and the constant frequency of said signal for discrimination is the frequency of the commercial electric power source.

5. A system for discriminating the classification of a magnetic recording medium as claimed in claim 1 which further comprises an indicating meter for indicating the level of said discrimination output and for indicating the classification of the magnetic recording medium in accordance with the resulting level indication.

6. A system for discriminating the classification of a magnetic recording medium as claimed in claim 1 which further comprises a plurality of bias setting means operating, in the recording of desired recording signal on the magnetic recording medium by means of the recording means, to set at respectively different values the quantity of the bias signal applied from the generating means to the recording magnetic head, and change-over means for changing over between said bias setting means in accordance with said discrimination output.

7. A system for discriminating the classification of a magnetic recording medium as claimed in claim 1 which further comprises indicating lamps for being lit to indicate the classification of the magnetic recording medium, and change-over means for changing over between said indicating lamps in accordance with said discrimination output.

8. A system for discriminating the classification of a magnetic recording medium as claimed in claim 1 which further comprises a plurality of level setting means operating, in the recording of a selected recording signal on the magnetic recording medium by means of the recording means, to set at respectively different values the recording level of the selected recording signal, and change-over means for changing over between said level setting means in accordance with said discrimination output.

9. A system for discriminating the classification of a magnetic recording medium as claimed in claim 1 which further comprises a plurality of frequency characteristic setting means operating, in the recording of a selected recording signal on the magnetic recording medium by means of the recording magnetic head, to set at respectively different values the recording frequency characteristic of said selected recording signal, and change-over means for changing over between said frequency characteristic setting means in accordance with said discrimination output.

10. A system for discriminating the classification of a magnetic recording medium as claimed in claim 1 which further comprises a plurality of bias setting means operating, in the recording of a desired recording signal on the magnetic recording medium by means of the recording means, to set at respectively different values the quantity of the bias signal applied from said generating means to the recording magnetic head, a plurality of level setting means for setting at respectively different values the recording levels of said desired recording signal, a plurality of frequency characteristic setting means for setting at respectively different characteristic the recording frequency characteristic of said desired recording signal, and change-over means for simultaneously changing over said bias setting means, said level setting means, and said recording frequency characteristic setting means.

* * * * *